(12) United States Patent
Korthals et al.

(10) Patent No.: US 9,750,179 B2
(45) Date of Patent: Sep. 5, 2017

(54) CONVERTIBLE MOWER DECK WITH MULCH ON DEMAND ACTUATOR

(71) Applicant: Deere & Company, Moline, IL (US)

(72) Inventors: Douglas D. Korthals, Fuquay-Varina, NC (US); Steven L. Dudzinski, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 347 days.

(21) Appl. No.: 13/889,697

(22) Filed: May 8, 2013

(65) Prior Publication Data

US 2014/0331634 A1   Nov. 13, 2014

(51) Int. Cl.
| | |
|---|---|
| *A01D 67/00* | (2006.01) |
| *A01D 34/00* | (2006.01) |
| *A01D 34/66* | (2006.01) |
| *A01D 42/00* | (2006.01) |

(52) U.S. Cl.
CPC .......... *A01D 34/005* (2013.01); *A01D 34/66* (2013.01); *A01D 42/005* (2013.01)

(58) Field of Classification Search
CPC .... A01D 42/005; A01D 34/71; A01D 34/005; A01D 34/81
USPC .............................................. 56/320.1, 320.2
See application file for complete search history.

(56) References Cited

U.S. PATENT DOCUMENTS

| | | | |
|---|---|---|---|
| 4,226,074 A * | 10/1980 | Mullet et al. ................ | 56/320.2 |
| 4,445,312 A * | 5/1984 | Cartner ......................... | 56/15.5 |
| 5,205,112 A | 4/1993 | Tillotson et al. | |
| 5,465,564 A | 11/1995 | Koehn et al. | |
| 5,526,633 A * | 6/1996 | Strong et al. ................ | 56/17.2 |
| 5,865,016 A * | 2/1999 | Toman ........................... | 56/7 |
| 6,609,358 B1 * | 8/2003 | Schmidt et al. ............. | 56/320.2 |
| 6,751,937 B2 * | 6/2004 | Kobayashi et al. .......... | 56/202 |
| 6,910,324 B2 | 6/2005 | Kakuk | |
| 7,174,700 B2 | 2/2007 | Chenevert et al. | |
| 7,185,479 B1 * | 3/2007 | Cartner ........................ | 56/320.1 |
| 7,204,073 B1 | 4/2007 | Chenevert | |
| 7,313,902 B1 * | 1/2008 | Eavenson et al. ............ | 56/13.6 |
| 7,555,887 B2 | 7/2009 | Schick et al. | |
| 7,677,022 B2 | 3/2010 | Chenevert et al. | |
| 7,775,027 B2 * | 8/2010 | Wang et al. ................. | 56/320.2 |
| 7,814,739 B2 * | 10/2010 | Uemura et al. ............. | 56/320.2 |
| 7,823,373 B1 | 11/2010 | Loxterkamp et al. | |
| 2002/0026779 A1 * | 3/2002 | Velke et al. ................. | 56/320.2 |
| 2004/0112031 A1 * | 6/2004 | Dickey ......................... | 56/320.2 |
| 2005/0039430 A1 * | 2/2005 | Samejima et al. ........... | 56/320.2 |
| 2008/0092509 A1 * | 4/2008 | Imanishi et al. ............. | 56/320.2 |
| 2011/0131942 A1 * | 6/2011 | Sugio et al. ................. | 56/320.2 |

* cited by examiner

*Primary Examiner* — Robert Pezzuto
*Assistant Examiner* — Mai Nguyen

(57) ABSTRACT

A convertible mower deck has a plurality of cutting chambers with a rotary cutting blade in each chamber and a side discharge opening from one of the cutting chambers, pivoting gates between the adjacent cutting chambers, and a pivoting side discharge door between a cutting chamber and the side discharge opening. Each of the gates and side discharge door are movable between a discharge or collection position and a mulching position. A mulch on demand actuator includes a switch in an operator station that causes a pivot control plate on a shaft to rotate and move linkages between the gates and door between the discharge or collection position and mulching position.

9 Claims, 5 Drawing Sheets

CONVERTIBLE MOWER DECK WITH MULCH ON DEMAND ACTUATOR

FIELD OF THE INVENTION

This invention relates to mower decks that are convertible between a discharge or collection position and a mulching position, and more specifically to a convertible mower deck with a mulch on demand actuator.

BACKGROUND OF THE INVENTION

Mower decks have been designed that are convertible between a discharge or collection position and a mulching position. For example, U.S. Pat. No. 6,609,358 for Mower Having a Mower Deck Adapted for Selective Mulching or Non-Mulching Modes relates to a mower deck that can be converted between a discharge or collection position and a mulching position without using tools, and without separately attaching or detaching components on the deck. The convertible mower deck enables an operator to avoid the inconvenience of having to stop mowing to either remove or install a mulch kit. The convertible mower deck has adjustable gates between adjacent cutting chambers that can be moved to an open position in which grass clippings move between the cutting chambers and out through a discharge opening, or to a closed position in which grass clippings are mulched by restricting their movement between cutting chambers and blocking the discharge opening. An operator may move the gates to either the open position or the closed position using a handle or lever that is part of a control structure on the top surface of the deck.

U.S. Pat. No. 7,174,700 for Mower Deck With Multiple Modes of Operation; U.S. Pat. No. 7,204,073 for Convertible Mower Deck With Interlocking Baffles; and U.S. Pat. No. 7,677,022 for Convertible Mower Deck With Angled Pivoting Baffles, also relate to mower decks that can be converted between a discharge or collection position and a mulching position. These convertible mower decks include handles that an operator may reach to pivot and convert the mower decks between their discharge or collection and mulching positions. Rods or linkages above the decks may connect the pivoting gates or baffles between adjacent cutting chambers.

There is a need for a convertible mower deck with a mulch on demand actuator in the operator station, that does not require the operator to reach outside of the operator station to a control or lever mounted on the deck. There is a need for a convertible mower deck that does not have linkages above the deck connecting the pivoting gates or baffles between adjacent cutting chambers.

SUMMARY OF THE INVENTION

A convertible mower deck includes a plurality of gates mounted under the deck, each gate pivotable between a discharge or collection position and a mulching position. Linkages under the deck connect between the gates. A mulch on demand actuator includes a switch located on a control console and an extendable actuator ram connected to the linkages and moving the linkages to pivot the gates between the discharge or collection position and the mulching position. The mulch on demand actuator does not require the operator to reach outside of the operator station to a control or lever mounted on the deck.

DESCRIPTION OF THE PREFERRED EMBODIMENT

Figure 1:
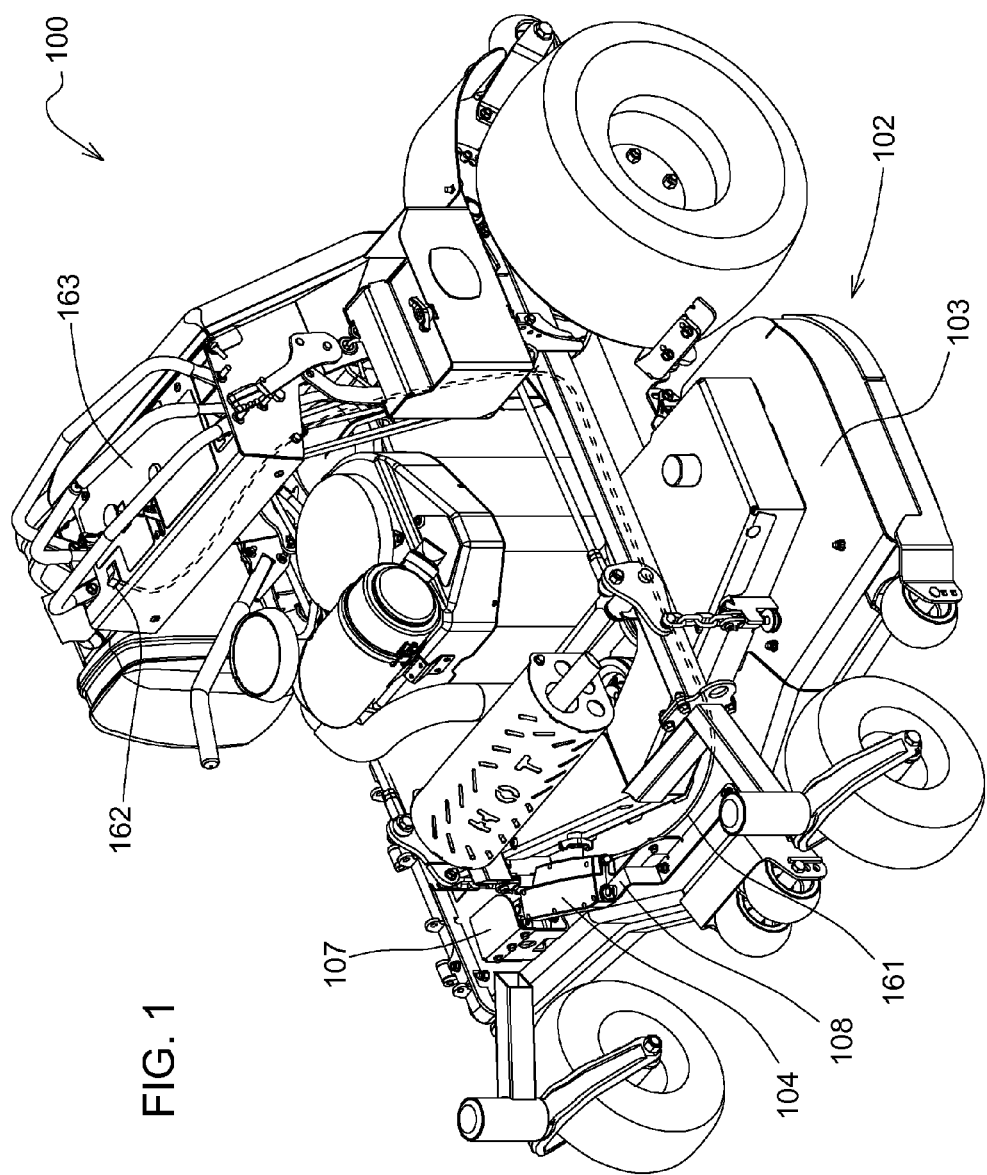
FIG. 1 is a perspective view of a stand on mower having a convertible mower deck with a mulch on demand actuator according to one embodiment of the invention.
Figure 2:
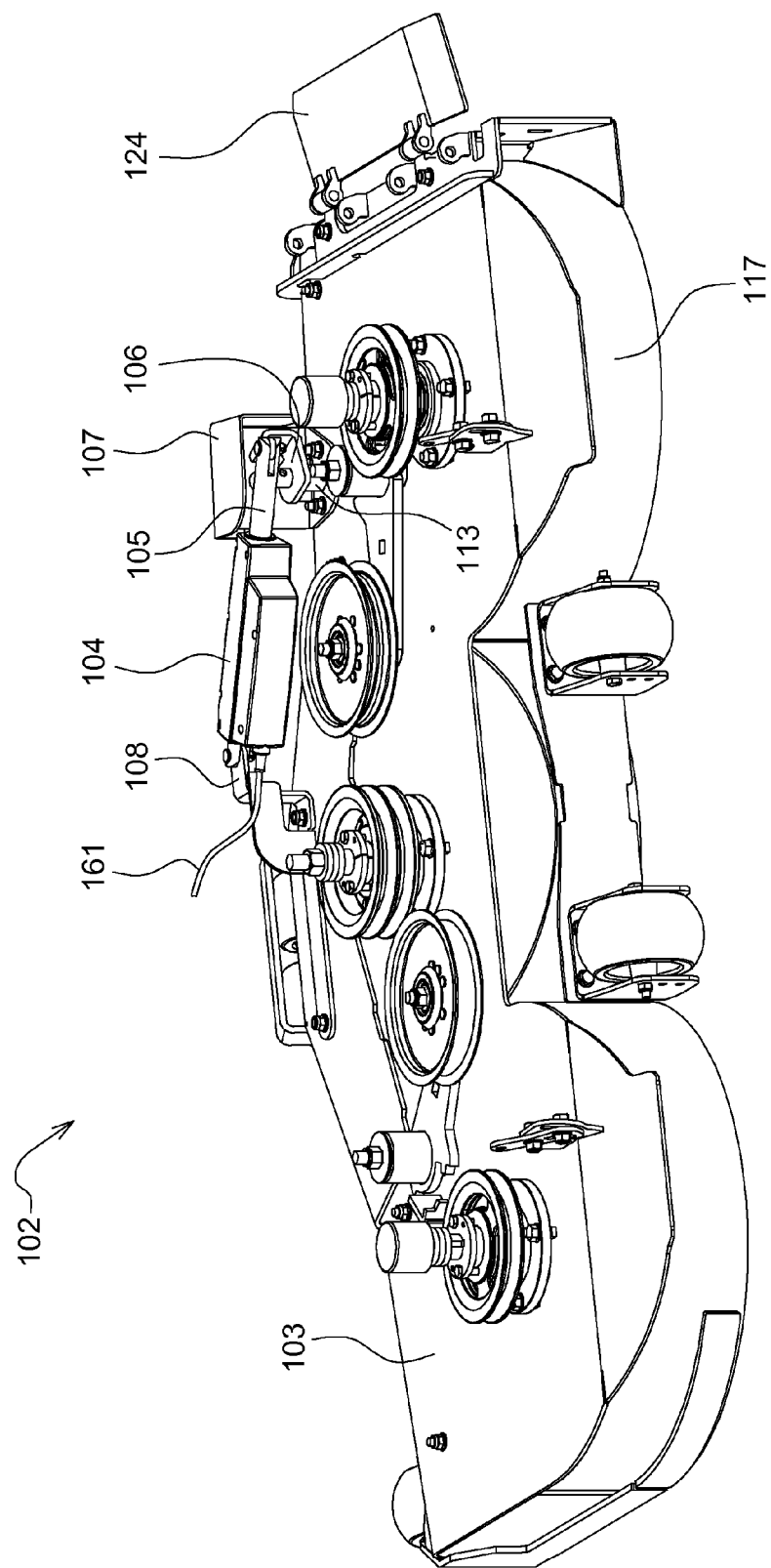
FIG. 2 is a top perspective view of a convertible mower deck with a mulch on demand actuator in a discharge or collection position according to one embodiment of the invention.
Figure 3:
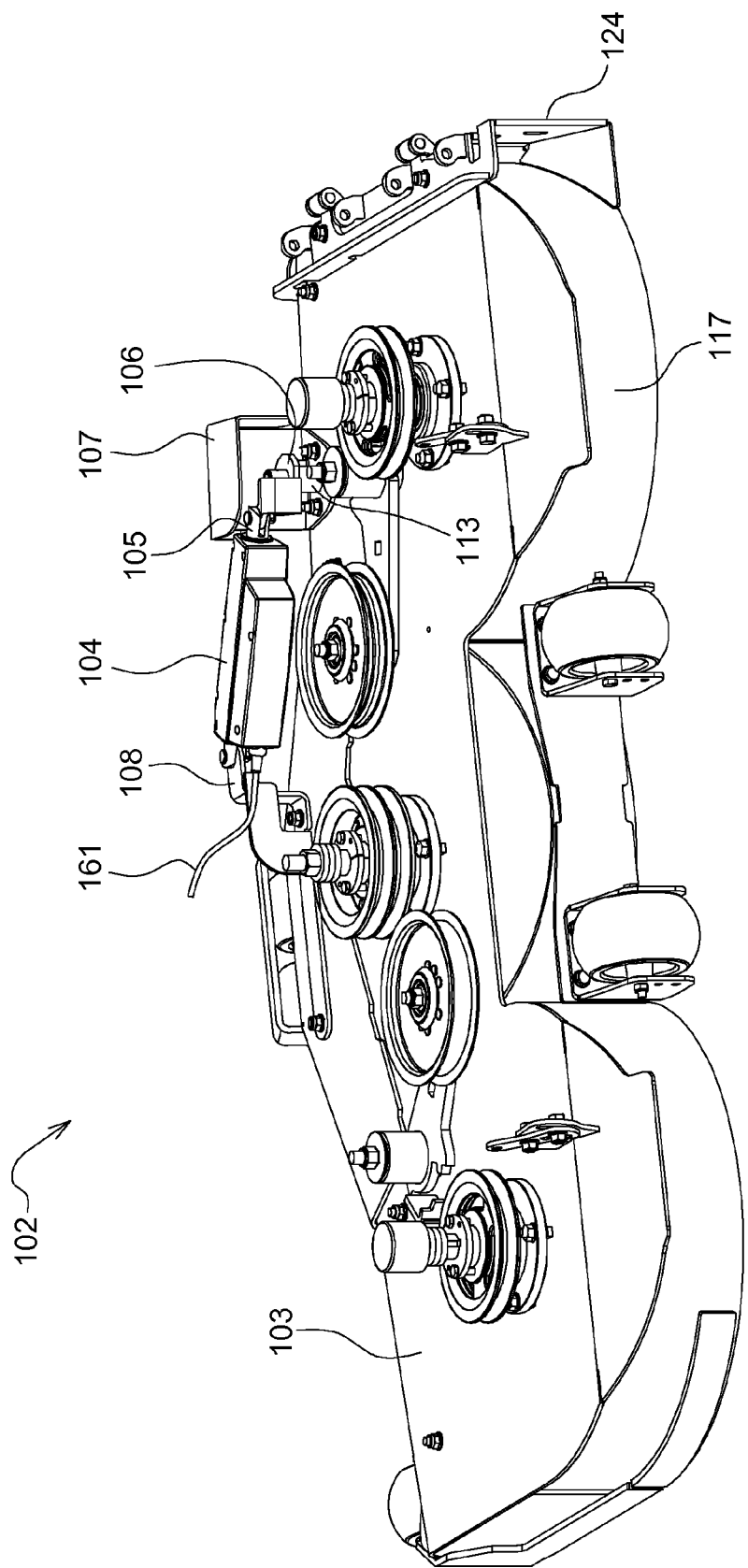
FIG. 3 is a top perspective of a convertible mower deck with a mulch on demand actuator in a mulching position according to one embodiment of the invention.

In one embodiment of the invention, shown in FIG. 1, stand on mower 100 is provided with convertible mower deck 102 suspended under the vehicle frame between the rear traction drive wheels and the front wheels. The convertible mower deck includes mulch on demand actuator 104 with directional electrical switch 162 located on control console 163 of the operator station. The mulch on demand actuator may be powered by a battery or other electrical power source (not shown), and may be connected by electrical wire 161. Alternatively, the mulch on demand actuator may use a hydraulic cylinder that may be actuated with a valve switch located on the control console, and connected by hydraulic lines to a hydrostatic system on the mower.

The operator may use the mulch on demand actuator while remaining in the operator station and without reaching out of the operator station to a control lever or other apparatus on the deck. The mulch on demand actuator is shown on a stand on mower, and also may be provided on other mowers having convertible mower decks including but not limited to riding lawn tractors, zero turn mowers and commercial walk behind mowers.

In one embodiment shown in FIGS. 2-5, convertible mower deck 102 may include and/or cover three adjacent cutting chambers, with each cutting chamber covering or housing a rotary cutting blade 110, 112, 114. The cutting blades may be mounted and secured to the lower ends of generally vertically oriented spindles for rotation on vertical axes. The spindles may be turned by one or more belts wound around pulleys attached to the upper ends of the spindles on the top deck surface 103.

In one embodiment, convertible mower deck 102 may have skirt 117 extending downwardly around at least a portion of the outer periphery from the top surface 103 of the deck. Gauge wheels may be attached to the skirt and/or periphery of the mower deck to help prevent or minimize damage or scalping of the ground surface or turf when mowing.

In one embodiment, pivoting gates 120, 122 and side discharge door 124 may be positioned under or to the side of the convertible mower deck. The gates and side discharge door may be pivoted to control the size of the passage or opening between adjacent cutting chambers, and between a cutting chamber and a side discharge opening.

In one embodiment, mulch on demand actuator 104 may be an electrical linear actuator. Alternatively, the mulch on demand actuator may be a hydraulic cylinder. A first end of the mulch on demand actuator may be pivotably connected with a pin to bracket 108 attached to the top surface 103 of the mower deck. Extendable actuator ram 105 may extend or retract from a second end of the actuator and may be connected with a pin to pivot control plate 106. The pivot control plate may be mounted to vertically oriented pivot shaft 113 extending through the mower deck from the top deck surface 103 to the bottom deck surface 115. Protective shield 107 may be provided on the top surface of the deck adjacent the pivot control plate.

In one embodiment, the mulch on demand actuator may have limiting switches to limit linear travel of the extendable actuator ram. For example, the electrical linear actuator may have proximity switches inside the housing that sense precisely how far the extendable actuator ram has moved, and internally disconnects current to the actuator motor when prescribed limits are reached. The limiting switches may be provided for both extended and retracted positions, to precisely and repeatedly stop the ram at specified locations.

In one embodiment, the mulch on demand actuator may include an electrical switch 162 on control console 163 that is a rocker switch providing continuous forward or reverse current flow after it is actuated, until limiting switches in the electrical linear actuator shut off current flow to the actuator motor. Alternatively, the mulch on demand actuator may include an electrical switch that is a momentary switch. The momentary switch may include a momentary circuit internal to the switch to hold current, and may include a rocker biased to a center position to stop flow of current. The momentary switch may allow the operator to actuate the switch for a desired duration to select any position from a full open side discharge or collection position to a mulching position.

In one embodiment, the mulch on demand actuator may be connected to linkages under the mower deck including gates 120, 122 and side discharge door 124. The linkages are configured to synchronize the pivoting of the gates and side discharge door between the side discharge or collection position and the mulching position.

For example, in one embodiment, crank arm 148 may be attached to a lower end of pivot shaft 113, converting rotational movement of the pivot shaft to linear movement of linkages that move gates 120, 122 and side discharge door 124 between the discharge or collection position and the mulching position. The linkages may include a plurality of interconnected control rods 134, 136, 138 under the bottom surface 115 of the mower deck, adjacent a forward end of the deck. The control rods may be pivotably connected to each other and to the gates and side discharge door.

Figure 4:
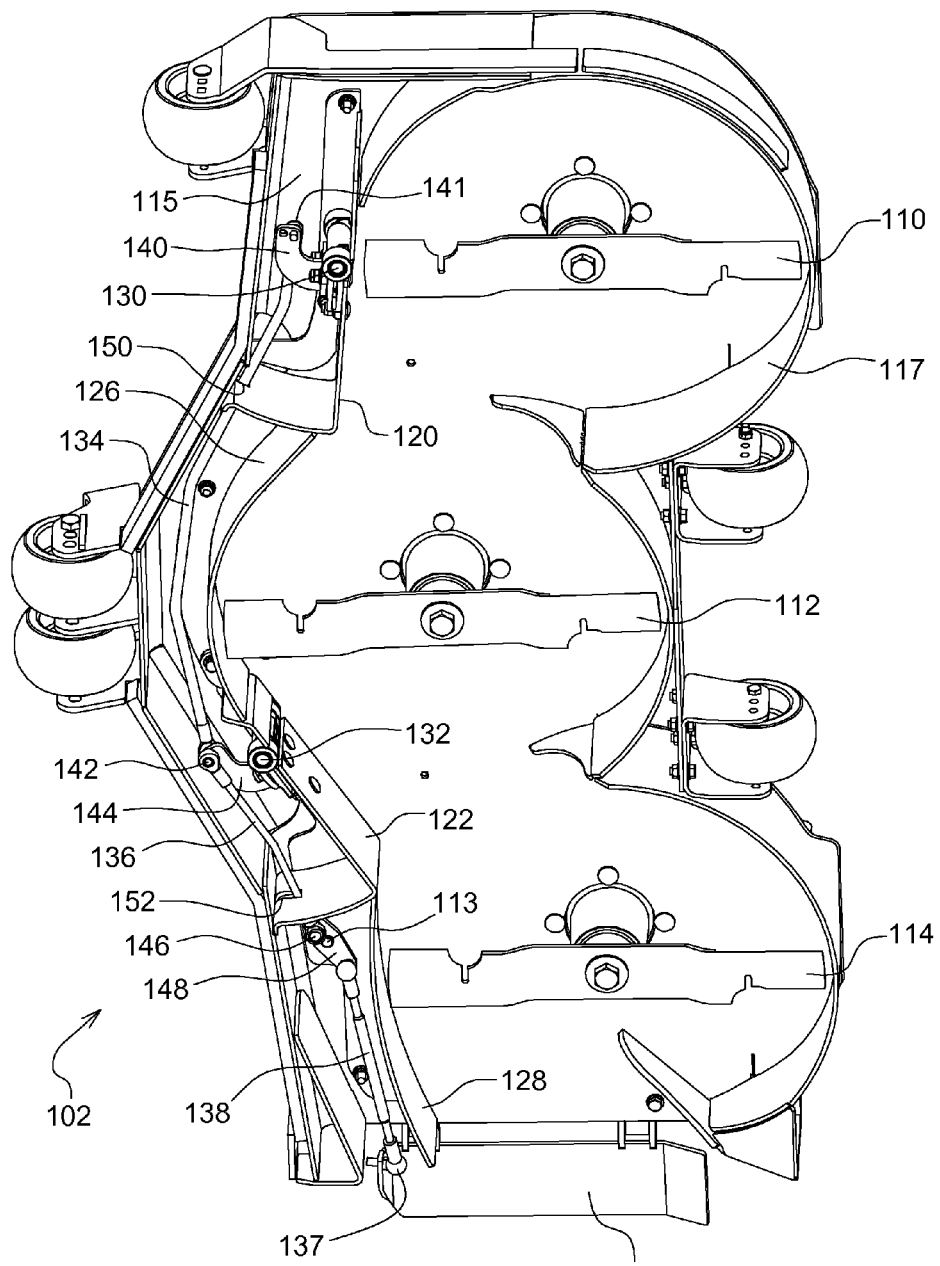
FIG. 4 is a bottom perspective view of a convertible mower deck with under deck linkages in a discharge or collection position according to one embodiment of the invention.
Figure 5:
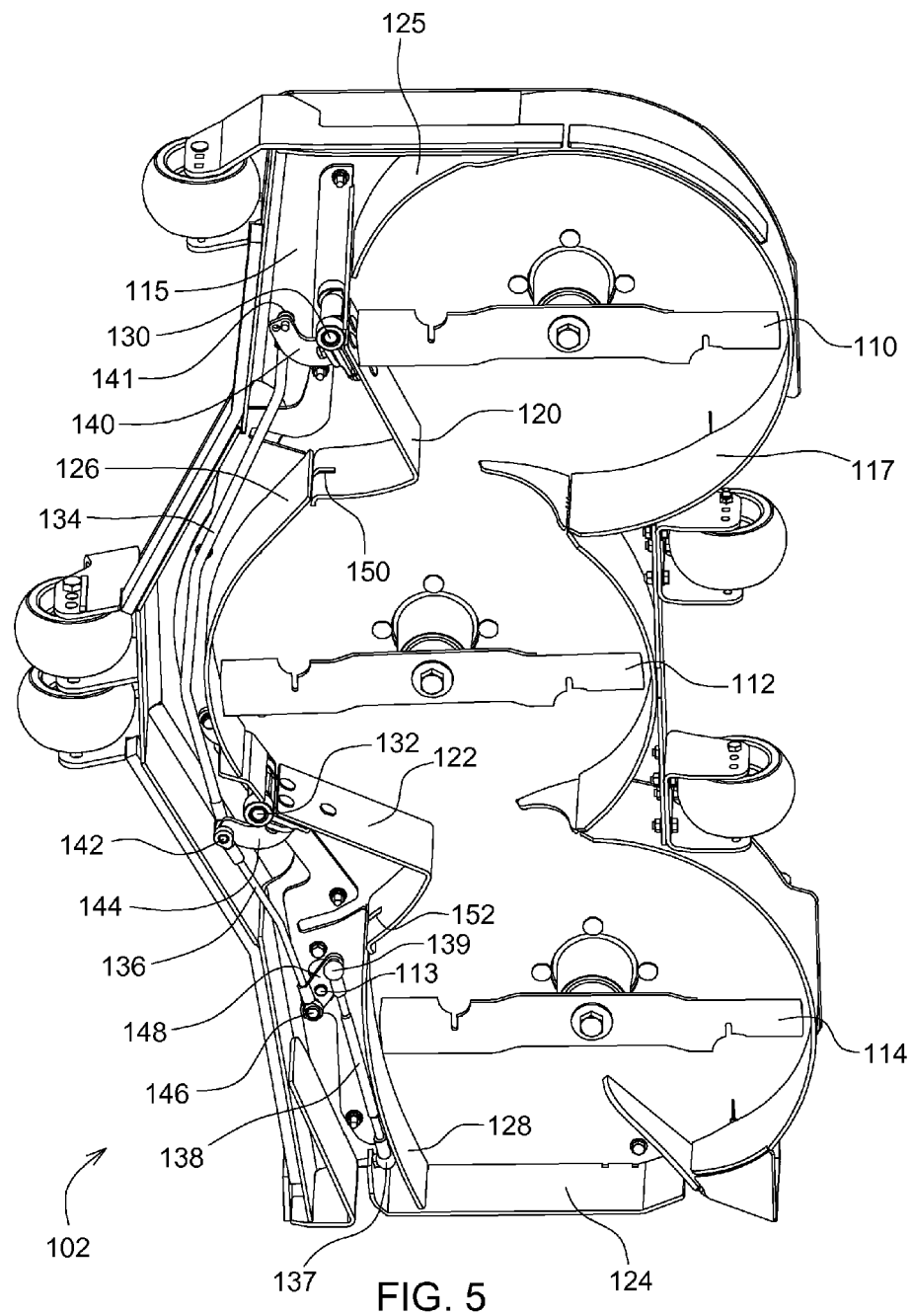
FIG. 5 is a bottom perspective view of a convertible mower deck with under deck linkages in a mulching position according to one embodiment of the invention.

For example, in one embodiment, the linkages may include control rod 138 having a first end connected at pivot joint 139 to a first end of crank arm 148, and a second end connected at pivot joint 137 to side discharge door 124. The linkages also may include control rod 136 having a first end connected at pivot joint 146 to a second end of crank arm 148, and a second end connected at pivot joint 142 to arm 144 attached to gate 122. As control rod 136 moves arm 144, gate 122 may pivot on vertical hinge or pivot shaft 132 between the discharge or collection position and the mulching position. As shown in FIG. 4, control rod 136 may extend through slot 152 in gate 122 while the gate is in the discharge or collection position.

In one embodiment, the linkages also may include control rod 134 having a first end connected at pivot joint 142 to arm 144, and a second end connected at pivot joint 141 to arm 140 attached to gate 120. As control rod 134 moves arm 140, gate 120 may pivot on vertical hinge 130 between the discharge or collection position and the mulching position. As shown in FIG. 4, control rod 134 may extend through slot 150 in gate 120 while the gate is in the discharge or collection position.

In one embodiment, convertible mower deck 102 may include stationary baffles 125, 126, 128 positioned forwardly of the cutting chambers, between the cutting chambers and the linkages. The vertical hinges of each gate may be attached to the underside of the deck adjacent a stationary baffle, and the gate may abut the stationary baffle when pivoted to the mulching position. In the mulching position, passages between adjacent cutting chambers may be reduced or restricted.

Having described the preferred embodiment, it will become apparent that various modifications can be made without departing from the scope of the invention as defined in the accompanying claims.

The invention claimed is:

1. A convertible mower deck comprising:
a deck having a plurality of cutting chambers with a rotary cutting blade in each chamber and a side discharge opening from one of the cutting chambers;
a plurality of pivoting gates between the adjacent cutting chambers;
a pivoting side discharge door between one of the cutting chambers and the side discharge opening;
each of the gates and the side discharge door being movable between a discharge or collection position and a mulching position; and
a mulch on demand actuator including an electrical switch on a control console in an operator station; the mulch on demand actuator including an electrical linear actuator ram causing a pivot control plate on a shaft to rotate and move a plurality of linkages attached to the pivoting gates and the side discharge door between the discharge or collection position and the mulching position without stopping the rotary cutting blades; the plurality of linkages being under the deck in front of the cutting chambers and behind a front skirt of the deck; at least one of the linkages extending through a slot in at least one of the gates in the discharge or collection position.

2. The convertible mower deck of claim 1 wherein the linkages are a plurality of control rods.

3. The convertible mower deck of claim 1 wherein a first end of the mulch on demand actuator is pivotably mounted to the mower deck, and a second end is pivotably mounted to the pivot control plate.

4. A convertible mower deck comprising:
a plurality of gates mounted under the deck, each gate pivotable between a discharge or collection position and a mulching position while mowing;
linkages under the deck in front of a plurality of cutting chambers and behind a front skirt of the deck and connecting between the gates;
a mulch on demand actuator including an electrical switch located on a control console and electrically connected to an extendable linear actuator ram connected to a pivot control plate mounted to a vertically oriented pivot shaft extending through the deck where the pivot shaft is connected to the linkages and moving the linkages to pivot the gates between the discharge or collection position and the mulching position; at least one of the linkages extending through a slot in one of the gates in the discharge or collection position.

5. The convertible mower deck of claim 4 further comprising a side discharge door connected to the linkages and pivoting between the discharge or collection position and the mulching position.

6. The convertible mower deck of claim 4 wherein the linkages include a plurality of control rods.

7. A convertible mower deck comprising:
a plurality of adjoining cutting chambers under a mower deck, each cutting chamber having a cutting blade mounted to the lower end of a vertical spindle;
openings between adjoining cutting chambers;
a side discharge opening from one of the cutting chambers;
a plurality of pivoting gates mounted under the deck between adjoining cutting chambers and a pivoting side discharge door mounted at the discharge opening; and
a mulch on demand actuator having an electrical switch on a control console of an operator station to extend or retract a linear actuator that rotates a shaft extending through the deck and connected to linkages to pivot the gates and the side discharge door; the linkages being under the deck in front of the cutting chambers and behind a front skirt of the deck; at least one of the linkages extending through a slot in one of the gates when the linear actuator is extended.

8. The apparatus of claim 7 wherein the linkages are a plurality of control rods under the deck interconnecting the gates and the side discharge door.

9. The apparatus of claim 7 wherein the linear actuator is connected to a pivot control plate on the shaft.

\* \* \* \* \*